(12) United States Patent
Vivanco et al.

(10) Patent No.: US 9,119,105 B1
(45) Date of Patent: Aug. 25, 2015

(54) MANAGING UNEVEN DATA FLOW IN A WIRELESS COMMUNICATION NETWORK

(71) Applicant: Sprint Spectrum LP, Overland Park, KS (US)

(72) Inventors: Daniel Vivanco, Sterling, VA (US); Krishna Sitaram, Chantilly, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 196 days.

(21) Appl. No.: 13/952,431

(22) Filed: Jul. 26, 2013

(51) Int. Cl.
*H04W 28/10* (2009.01)

(52) U.S. Cl.
CPC ..................................... *H04W 28/10* (2013.01)

(58) Field of Classification Search
CPC ..... H04L 47/12; H04L 47/2441; H04L 47/60; H04L 47/6215; H04W 72/04
See application file for complete search history.

(56) References Cited

U.S. PATENT DOCUMENTS 6,839,767 B1 * 1/2005 Davies et al. ................. 709/232

OTHER PUBLICATIONS

ETSI TS 132 450 V10.1.0 (Jun. 2011) Technical Specification, produced by ETSI 3rd Generation Partnership Project.

* cited by examiner

*Primary Examiner* — Yong Zhou (57) ABSTRACT

A first throughput value is determined comprising a first total amount of data transmitted in non-final data packets from a sending network element to a wireless device and a second total amount of data in final data packets transmitted to the wireless device during a time period. A second throughput value is determined comprising the first total amount of data transmitted in non-final data packets to the wireless device during the time period less an idle time of a wireless communication link between an access node and the wireless device during the time period and less a total time to deliver the final data packets. A difference of the first throughput value and the second throughput value is calculated, and a traffic management procedure is performed when the difference of the first throughput value and the second throughput value meets a throughput threshold.

20 Claims, 6 Drawing Sheets

FIG. 6 ically, such as using different carriers, or different modulation and coding schemes over a carrier), among other things. Determinations of the presence and quantity of uneven data flows in a communication network are important for network configuration, operation and planning.

MANAGING UNEVEN DATA FLOW IN A WIRELESS COMMUNICATION NETWORK

TECHNICAL BACKGROUND

Data flow characteristics can affect the performance of a communication network. A prevalence of uneven data flows (so-called "bursty" data traffic) can lead to data transmission delays, jitter in data communication, and ultimately deterioration of application performance. Uneven data flows can be caused by numerous factors including network congestion, wireless device mobility, variations in the wireless communication environment, and varying use of wireless communication link resources over time (such as using different carriers, or different modulation and coding schemes over a carrier), among other things. Determinations of the presence and quantity of uneven data flows in a communication network are important for network configuration, operation and planning.

OVERVIEW

In operation, a first throughput value is determined comprising a first total amount of data transmitted in non-final data packets from a sending network element to a wireless device and a second total amount of data in final data packets transmitted from the sending network element to the wireless device during a time period. In addition, a second throughput value is determined comprising the first total amount of data transmitted in non-final data packets from the sending network element to the wireless device during the time period less an idle time of a wireless communication link between an access node and the wireless device during the time period and less a total time to deliver the final data packets. A difference of the first throughput value and the second throughput value is calculated. The first throughput value and the second throughput value can be monitored, and the difference of the first throughput value and the second throughput value can be re-calculated. When the difference of the first throughput value and the second throughput value meets a throughput threshold, a traffic management procedure is performing at an access node of the wireless communication network when the difference of the first throughput value and the second throughput value meets a throughput threshold. In an embodiment, the traffic management procedure is performed when the difference of the first throughput value and the second throughput value indicates the presence of a number of short-lived data flows which meets a short-lived data flow threshold.

DETAILED DESCRIPTION

Figure 1:
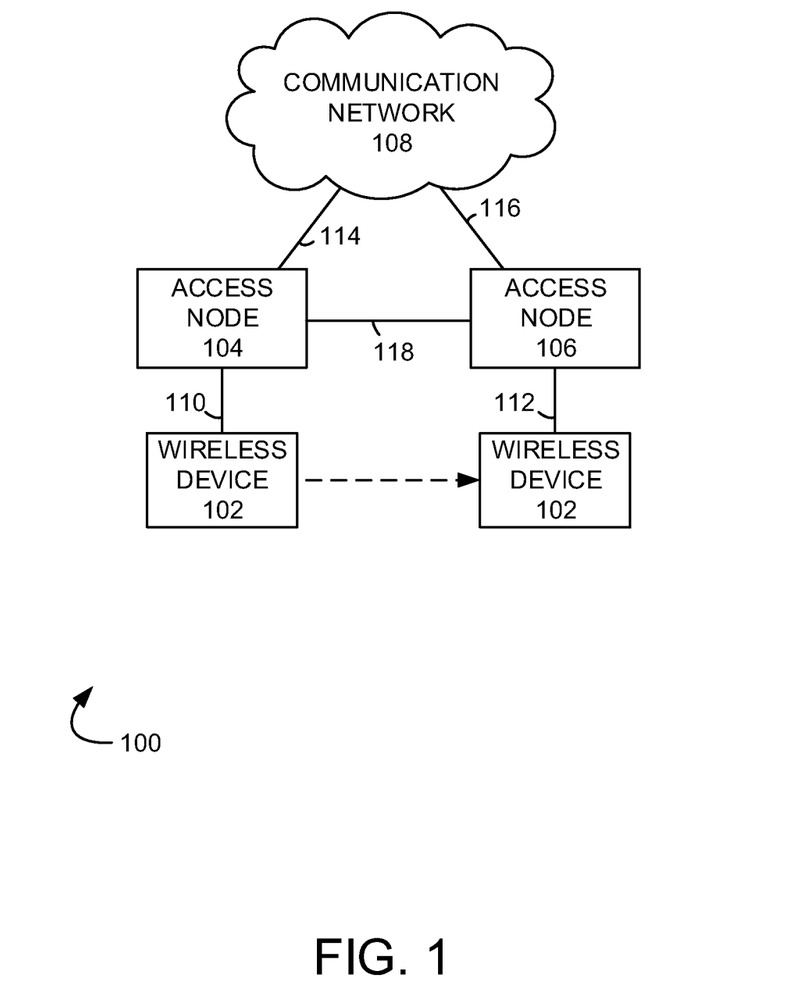
FIG. 1 illustrates an exemplary communication system to manage uneven data flow in a wireless communication network.

FIG. 1 illustrates an exemplary communication system 100 to process a call request comprising wireless device 102, access node 104, access node 106, and communication network 106. Examples of wireless device 102 can comprise a cell phone, a smart phone, a computing platform such as a laptop, palmtop, or tablet, a personal digital assistant, or an internet access device, including combinations thereof. Wireless device 102 can communicate with access node 104 over communication link 110 and with access node 106 over communication link 112.

Access nodes 104 and 106 are each a network node capable of providing wireless communications to wireless device 102, and can be, for example, a base transceiver station, a radio base station, an eNodeB device, or an enhanced eNodeB device. Access node 104 is in communication with communication network 108 over communication link 114, and access node 106 is in communication with communication network 108 over communication link 116. Access nodes 104 and 106 can also communicate with each other over communication link 118. Although one wireless device 102 is illustrated for conciseness, it will be appreciated that more than one wireless device can be in communication with access nodes 104 and 106.

Communication network 108 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 108 can be capable of carrying voice information and other data, for example, to support communications by a wireless device such as wireless device 102. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), and Third Generation Partnership Project Long Term Evolution (3GPP LTE). Wired network protocols that may be utilized by communication network 108 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 108 may also comprise a wireless network, including base stations, wireless communication nodes, telephony switches, internet routers, network gateways, computer systems, communication links, or some other type of communication equipment, and combinations thereof.

Communication links 110, 112, 114, 116 and 118 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 104, access node 106, and communication network 108 which are omitted for clarity, including additional processing nodes, routers, gateways, and physical and/or wireless data links for carrying data among the various network elements.

Data traffic moving across communication networks reflects the amount of information and the size of the units used to convey it. Large amounts of information can require longer streams of data traffic to convey it, and shorter amounts of information can be conveyed with shorter streams of data. A data flow can be referred to as uneven (or "bursty") when it is substantially non-constant or non-smooth, or when it varies rapidly, over a period of time.

Data traffic is typically transported across digital communication networks using a transport protocol, such as the Transport Control Protocol (TCP), which is common to numerous application types. TCP includes congestion control and avoidance methods that determine an appropriate congestion window for a network node or element by increasing the traffic through the network node until packet loss is detected. The use of an additive increase/multiplicative decrease (AMID) feedback control algorithm in TCP causes a dramatic reduction in the rate of packet transmission from a network node when congestion is detected. Within TCP, data flows can be characterized as short-lived and long-lived. Long-lived data flows begin in the TCP slow start phase, and typically end in the TCP congestion avoidance phase in which AMID congestion control is applied. Short-lived data flows typically reach only the TCP slow start phase, in which the TCP congestion window is increased exponentially. Examples of short-lived TCP flows includes traffic related to web-browsing, email, instant messaging, SMS messaging, and so forth. Examples of long-lived TCP flows include streaming audio, video, and multimedia information, file transfer (FTP) traffic, Telnet traffic, and the like. While short-lived TCP flows typically carry a small amount of the total information conveyed by a communication network, they can represent a large percentage of the TCP data flows. The presence of short-lived TCP flows can indicate uneven data flow, and as the number of short-lived TCP flows increases, the volume of uneven data flow can be determined to increase. Where information is divided into units for transport, such as data packets, it is likely that the last unit comprises less data than the preceding units. For example, where data packets are transmitted to a wireless device over a wireless communication link at different time transmission intervals (TTIs), the last TTI will typically comprise less data than the other (preceding, or non-final) data packets.

High variability in data flow evenness can cause jitter and/or throughput delay in a communication network. Uneven data flows can be caused by numerous factors including network congestion, wireless device mobility, variations in the wireless communication environment, and varying use of wireless communication link resources over time (such as using different carriers, or different modulation and coding schemes over a carrier), among other things. Determinations of the presence and quantity of uneven data flows in a communication network are important for network configuration, operation and planning.

In operation, a first throughput value and a second throughput value are determined for information transmitted to wireless device 102. The first throughput value can comprise a first total amount of data transmitted in non-final data packets from a sending network element to a wireless device and a second total amount of data in final data packets transmitted from the sending network element to the wireless device during a time period. The sending network element can comprise a source of information, such as a content provider, a data provider, and the like, from which information is requested and transmitted to a requesting network node, such as wireless device 102. The sending network element can be a network element of communication network 108. The second throughput value can comprise the first total amount of data transmitted in non-final data packets from the sending network element to the wireless device during the time period less an idle time of a wireless communication link between an access node and the wireless device during the time period and less a total time to deliver the final data packets.

The first throughput value and the second throughput value can be monitored, and a difference of the first throughput value and the second throughput value is calculated. When the difference of the first throughput value and the second throughput value meets a throughput threshold, a traffic management procedure is performing at an access node of the wireless communication network when the difference of the first throughput value and the second throughput value meets a throughput threshold. In an example, the traffic management procedure is performed when the difference of the first throughput value and the second throughput value indicates the presence of a number of short-lived data flows which meets a short-lived data flow threshold.

Figure 2:
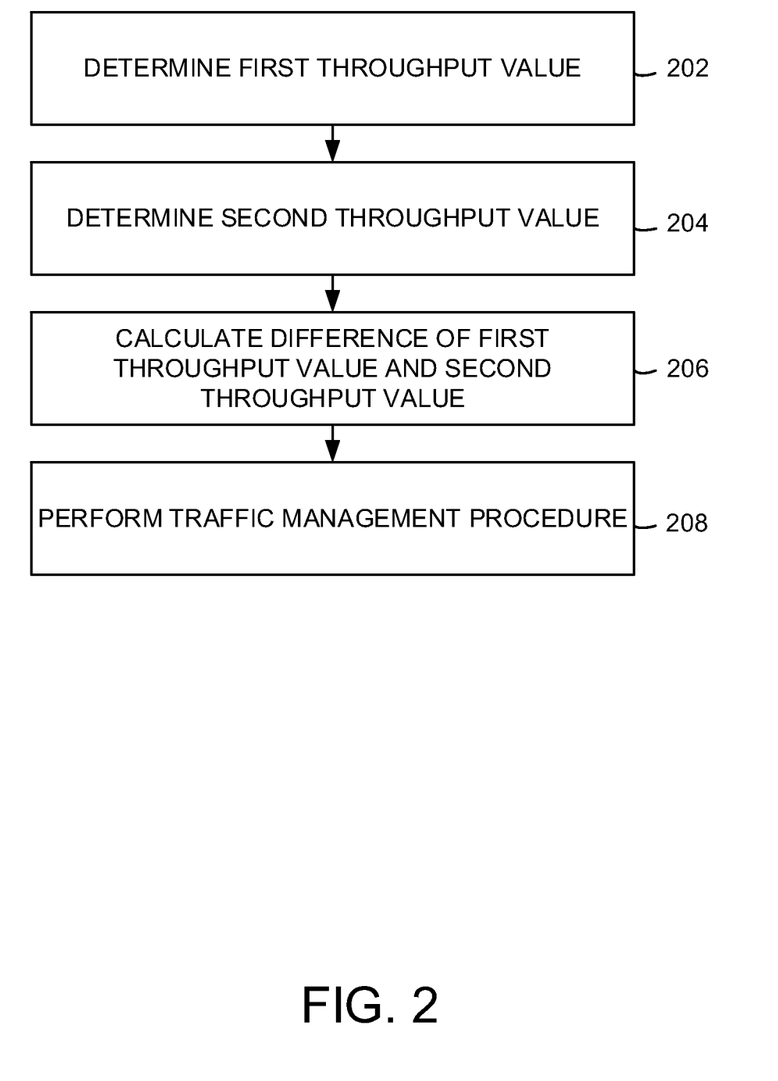
FIG. 2 illustrates an exemplary method of managing uneven data flow in a wireless communication network.
Figure 3:
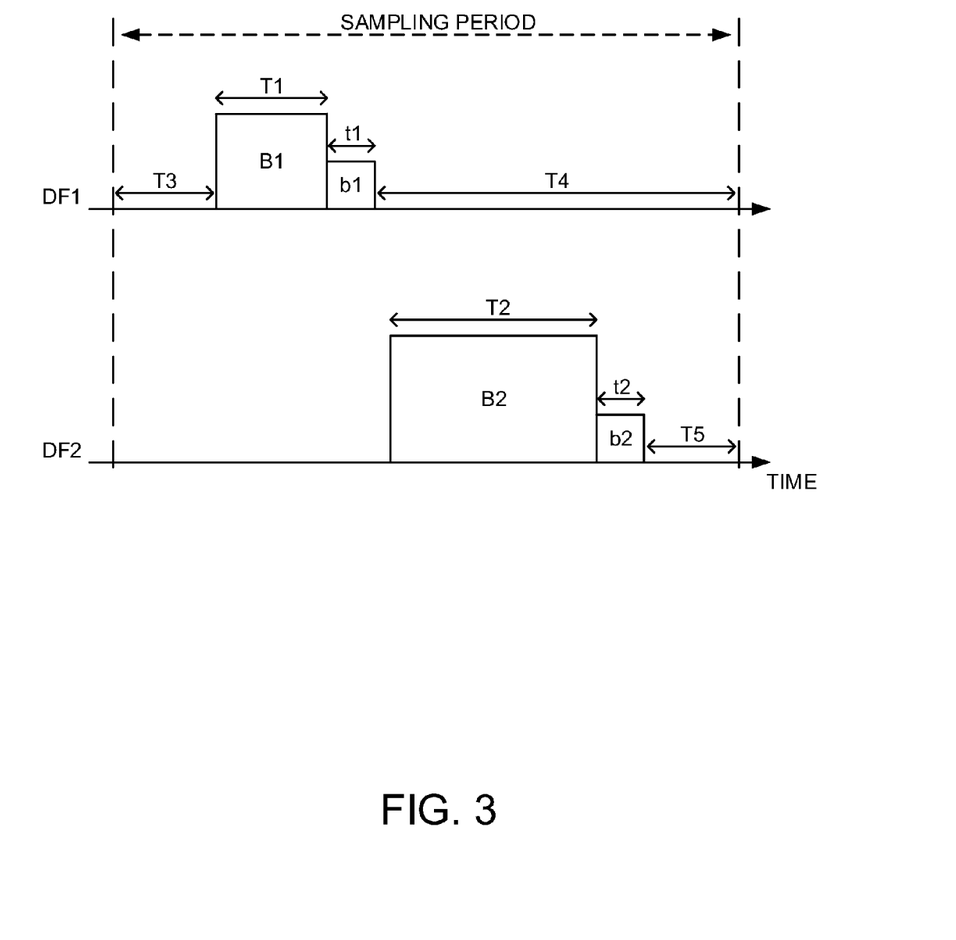
FIG. 3 illustrates exemplary measurements of data traffic during a sampling period.

FIG. 2 illustrates an exemplary method of managing uneven data flow in a wireless communication network. In operation 202, a first throughput value is determined comprising a first total amount of data transmitted in non-final data packets from a sending network element to a wireless device and a second total amount of data in final data packets transmitted from the sending network element to the wireless device during a time period. For example, a network element of communication network 108 can send data packets to wireless device 102 comprising non-final data packets and at least one final data packet. When data is fragmented at the IP layer into data packets, the final data packet is likely to comprise less data than the preceding (non-final) data packets. Referring to FIG. 3, the first total amount of data transmitted in non-final data packets in a first data flow DF1 can comprise an amount B1 transmitted during the sampling period. Data flow DF1 can be transmitted to a first wireless device during the sampling period. The second total amount of data transmitted in final data packets can comprise an amount b1 transmitted in data flow DF1 during the sampling period. The first throughput value can comprise the first total amount B1 and the second total amount of data b1 transmitted from the sending network element in data flow DF1 during the sampling period.

In an embodiment, a third amount of data transmitted in a second data flow DF2 in non-final data packets can comprise an amount B2 transmitted during the sampling period. Also, a fourth amount of data transmitted in final data packets can comprise an amount b2 transmitted in data flow DF2 during the sampling period. Taking data sent in both data flows DF1 and DF2 into account, the first throughput value can comprise the sum of all data sent in data flows DF1 and DF2 in final and in non-final data packets during the sampling period. Data flows DF1 and DF2 can be sent to the first wireless device. Alternatively, or additionally, data flow DF1 can be sent to the first wireless device and data flow DF2 can be sent to a second wireless device. Thus, a first throughput value can be determined comprising a first total amount of data transmitted in non-final data packets of a plurality of data flows from a sending network element to a wireless device and a second total amount of data in final data packets of the plurality of data flows transmitted from the sending network element to the wireless device during a time period.

Returning to FIG. 2, in operation 204, a second throughput value is determined comprising the first total amount of data transmitted in non-final data packets from the sending network element to the wireless device during the time period less an idle time of a wireless communication link between an access node and the wireless device during the time period and less a total time to deliver the final data packets. For example, referring again to FIG. 3, the first total amount of data transmitted to a first wireless device in non-final data packets can comprise an amount B1 transmitted in data flow DF1 during the sampling time period. The idle time can comprise a time period when data is not transmitted in data flow DF1, and can comprise time periods T3 and T4. The time to deliver the final packet of amount b1 can comprise time period t1. The second throughput value can comprise the first total amount B1 transmitted during the sampling period, and where times T3, T4, t1 are subtracted from the time of the sampling period.

In an embodiment, where data flows DF1 and DF2 are taken into account, the second throughput value can comprise the total of amounts B1 and B2 transmitted during the sampling period, where idles times T3 and T5, and the total time to transmit final data packets t1 and t2, are subtracted from the time of the sampling period. Thus, a second throughput value can be determined comprising the first total amount of data transmitted in non-final data packets from the sending network element to the wireless device during the time period less an idle time of a wireless communication link between an access node and the wireless device during the time period and less a total time to deliver the final data packets of a plurality of data flows.

Returning to FIG. 2, a difference of the first throughput value and the second throughput value is calculated (operation 206), and when the difference of the first throughput value and the second throughput value meets a throughput threshold, a traffic management procedure is performed at an access node of the wireless communication network (operation 208). For example, data traffic transmitted from access node 104 to wireless device 102 can be monitored, and a difference of the first throughput value and the second throughput value can be calculated. The difference of the first throughput value and the second throughput value can indicate the presence of uneven data flows (short-lived data flows), which can affect the provision of information and/or services to wireless device 102. The throughput threshold can comprise a threshold level of uneven data flows.

When the difference of the first throughput value and the second throughput value meets a throughput threshold, a traffic management procedure can be performed at access node 102. The traffic management procedure can comprise performing a handover of wireless device 102 from first access node 104 to second access node 106 when the difference of the first throughput value and the second throughput value meets the throughput threshold. Additionally, or alternatively, the traffic management procedure can further comprise limiting an amount of data transmitted within a predetermined time period from the access node to the wireless device when the difference of the first throughput value and the second throughput value meets the throughput threshold. Limiting or throttling the amount of data transmitted within the predetermined time period can reduce the number of uneven data flows over communication link 110. Further additionally, or alternatively, the traffic management procedure can further comprise limiting an amount of wireless communication link resources used to convey data from the from the access node to the wireless device when the difference of the first throughput value and the second throughput value meets the throughput threshold. For example, a limit can be imposed on an amount of bandwidth allocated to transport data packets, or a number of slots, or a number of physical resource blocks, or a number of resource elements, or on some other communication link resource, to reduce the number of uneven data flows over communication link 110.

Figure 4:
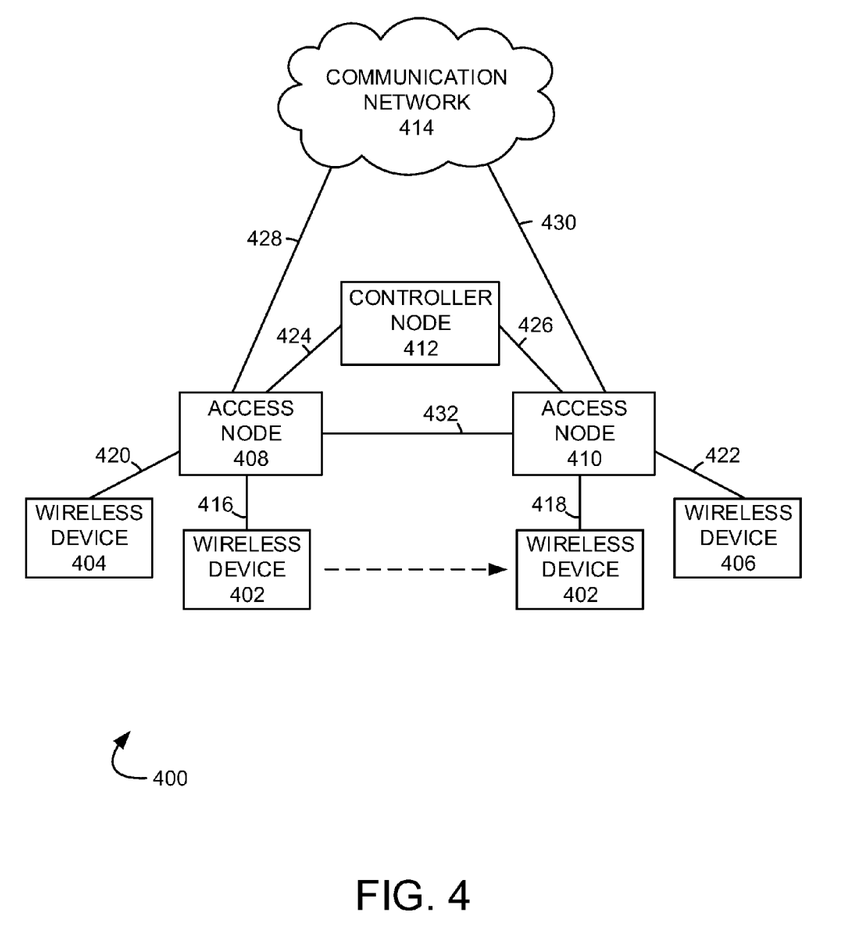
FIG. 4 illustrates another exemplary communication system to manage uneven data flow in a wireless communication network.

FIG. 4 illustrates another exemplary communication system 400 to manage uneven data flow in a wireless communication network comprising wireless devices 402, 404 and 406, access nodes 408 and 410, controller node 412, and communication network 414. Examples of wireless devices 402, 404 and 406 can comprise a cell phone, a smart phone, a computing platform such as a laptop, palmtop, or tablet, a personal digital assistant, or an internet access device, including combinations thereof. Wireless device 402 can communicate with access node 408 over communication link 416 and with access node 410 over communication link 418. Wireless device 404 can communicate with access node 408 over communication link 420. Wireless device 406 can communicate with access node 410 over communication link 422.

Access nodes 408 and 410 are each a network node capable of providing wireless communications to wireless devices 402, 404 and 406, and can be, for example, a base transceiver station, a radio base station, an eNodeB device, or an enhanced eNodeB device. Access node 104 is in communication with communication network 414 over communication link 428, and with controller node 412 over communication link 424. Access node 410 is in communication with communication network 414 over communication link 430, and with controller node 412 over communication link 426. Access nodes 408 and 410 can also communicate with each other over communication link 432. While two access nodes 408 and 410 are illustrated in FIG. 4 for conciseness, it will be appreciated that a greater number of access nodes can be present in communication system 400 comprising analogous functionality and communication links as access nodes 408 and 410.

Controller node 412 can comprise can comprise a processor and associated circuitry to execute or direct the execution of computer-readable instructions, and can be configured to manage uneven data flow in a wireless communication network. Controller node 412 can control the setup and maintenance of a communication session over communication network 414 by wireless devices 402, 404 and 406. Controller node 412 can comprise a mobile switching center (MSC), a dispatch call controller (DCC), a mobility management entity (MME), or other similar network node. Controller node 412 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Controller node 412 can receive instructions and other input at a user interface.

Communication network 414 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 414 can be capable of carrying voice information and other data, for example, to support communications by a wireless device such as wireless devices 402, 404 and 406. Wireless network protocols may comprise code division multiple access (CDMA)

1xRTT, Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), and Third Generation Partnership Project Long Term Evolution (3GPP LTE). Wired network protocols that may be utilized by communication network 108 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 414 may also comprise a wireless network, including base stations, wireless communication nodes, telephony switches, internet routers, network gateways, computer systems, communication links, or some other type of communication equipment, and combinations thereof.

Communication links 416, 418, 420, 422, 424, 426, 428, 430, and 432 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 400 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access nodes 408 and 410, controller node 412, and communication network 414, which are omitted for clarity, including additional processing nodes, routers, gateways, and physical and/or wireless data links for carrying data among the various network elements.

Figure 5:
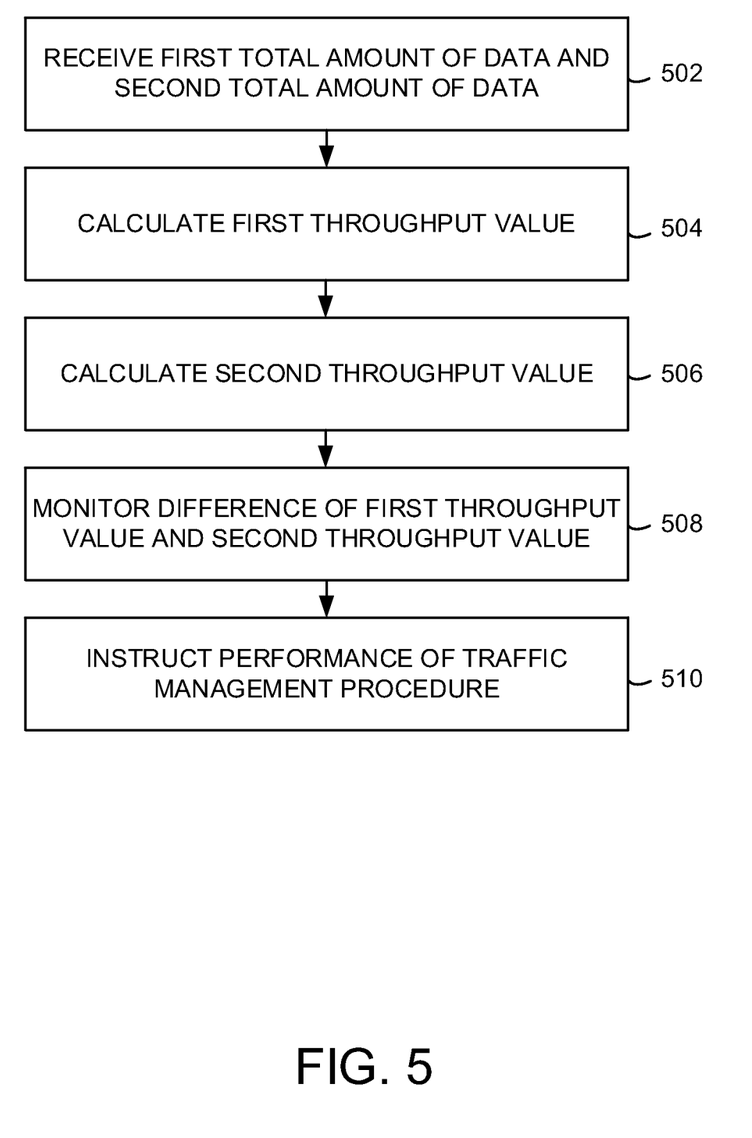
FIG. 5 illustrates another exemplary method of managing uneven data flow in a wireless communication network.

FIG. 5 illustrates another exemplary method of managing uneven data flow in a wireless communication network. In operation 502, a first total amount of data and a second total amount of data are received at a network element from a plurality of access nodes. The first total amount of data can comprise a total amount of data transmitted in non-final data packets of a plurality of data flows from a sending network element to at least one wireless device during a time period. The second total amount of data can comprise a total amount of data in final data packets of the plurality of data flows transmitted from the sending network element to the at least one wireless device during the time period. The time period can comprise a sampling time period. For example, controller node 412 can receive the first and second total amounts of data from access nodes 408 and 410. The first and second total amounts can comprise data transmitted to wireless devices 402, 404 and 406.

In operation 504, a first throughput value is determined comprising the first total amount of data transmitted in non-final data packets of a plurality of data flows from a sending network element to at least one wireless device during the time period, and the second total amount of data in final data packets of the plurality of data flows transmitted from the sending network element to the at least one wireless device during the time period. For example, a network element of communication network 414 can send data packets to wireless devices 402, 404 and 406 comprising non-final data packets and at least one final data packet. When data is fragmented at the IP layer into data packets, the final data packet is likely to comprise less data than the preceding (non-final) data packets.

A second throughput value is determined (operation 506) comprising the first total amount of data transmitted in non-final data packets of a plurality of data flows from a sending network element to at least one wireless device during the time period less an idle time of a wireless communication link between an access node and the wireless device during the time period and less a total time to deliver the final data packets. The second throughput can also be determined based on data sent to wireless devices 402, 404 and 406.

A difference of the first throughput value and the second throughput value is monitored (operation 508), and when the difference of the first throughput value and the second throughput value meets a throughput threshold, a traffic management procedure is performed at an access node of the wireless communication network (operation 510). For example, data traffic transmitted from access nodes 408 and 410 to wireless device 402, 404 and 406 can be monitored, and a difference of the first throughput value and the second throughput value can be calculated. The difference of the first throughput value and the second throughput value can indicate the presence of uneven data flows (short-lived data flows), which can affect the provision of information and/or services to wireless devices 402, 404 and 406. The throughput threshold can comprise a threshold level of uneven data flows.

When the difference of the first throughput value and the second throughput value meets a throughput threshold, a traffic management procedure can be performed at access node 408 and/or access node 410. The traffic management procedure can comprise performing a handover of wireless device 402 from first access node 408 to second access node 410 when the difference of the first throughput value and the second throughput value meets the throughput threshold. Additionally, or alternatively, the traffic management procedure can further comprise limiting an amount of data transmitted within a predetermined time period from the access node to the wireless device when the difference of the first throughput value and the second throughput value meets the throughput threshold. Limiting or throttling the amount of data transmitted within the predetermined time period can reduce the number of uneven data flows over communication link 416. Further additionally, or alternatively, the traffic management procedure can further comprise limiting an amount of wireless communication link resources used to convey data from the from the access node to the wireless device when the difference of the first throughput value and the second throughput value meets the throughput threshold. For example, a limit can be imposed on an amount of bandwidth allocated to transport data packets, or a number of slots, or a number of physical resource blocks, or a number of resource elements, or on some other communication link resource, to reduce the number of uneven data flows over communication link 416.

Figure 6:
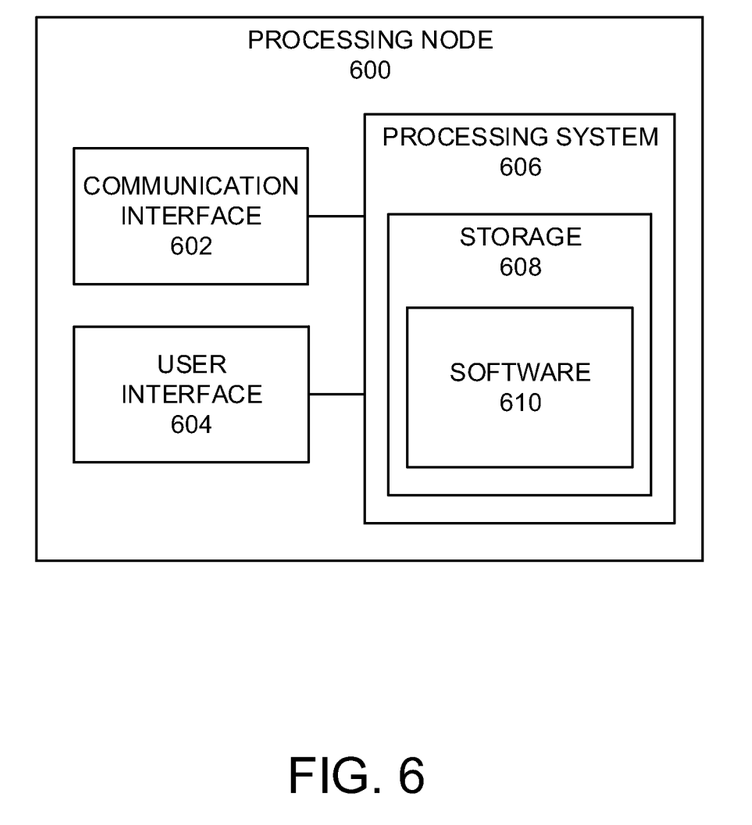
FIG. 6 illustrates an exemplary processing node.

FIG. 6 illustrates an exemplary processing node 600 in a communication system. Processing node 600 comprises communication interface 602, user interface 604, and processing system 606 in communication with communication interface 602 and user interface 604. Processing node 600 can be configured to manage uneven data flow in a wireless communication network. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

Examples of processing node 600 include access nodes 104 and 106, access nodes 408 and 410, and controller node 412. Processing node 600 can also be an adjunct or component of a network element, such as an element of access nodes 104, 106, 408 and 410, and controller node 412. Processing node 600 can also be another network element in a communication system. Further, the functionality of processing node 600 can be distributed over two or more elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method of managing uneven data flow in a wireless communication network, comprising:
determining a first throughput value comprising a first total amount of data transmitted in non-final data packets from a sending network element to a wireless device and a second total amount of data in final data packets transmitted from the sending network element to the wireless device during a time period;
determining a second throughput value comprising the first total amount of data transmitted in non-final data packets from the sending network element to the wireless device during the time period less an idle time of a wireless communication link between an access node and the wireless device during the time period and less a total time to deliver the final data packets;
calculating a difference of the first throughput value and the second throughput value; and
performing a traffic management procedure at an access node of the wireless communication network when the difference of the first throughput value and the second throughput value meets a throughput threshold.

2. The method of claim 1, wherein performing the traffic management procedure further comprises performing a handover of the wireless device from the access node to a second access node when the difference of the first throughput value and the second throughput value meets the throughput threshold.

3. The method of claim 1, wherein performing the traffic management procedure further comprises limiting an amount of data transmitted within a predetermined time period from the access node to the wireless device when the difference of the first throughput value and the second throughput value meets the throughput threshold.

4. The method of claim 1, wherein performing the traffic management procedure further comprises limiting an amount of wireless communication link resources used to convey data from the access node to the wireless device when the difference of the first throughput value and the second throughput value meets the throughput threshold.

5. The method of claim 1, further comprising:
determining a first throughput value comprising a first total amount of data transmitted in non-final data packets of at least one data flow from a sending network element to the wireless device a wireless device and a second total amount of data in final data packets of the at least one data flow transmitted from the sending network element to the wireless device during a time period; and
determining a second throughput value comprising the first total amount of data transmitted in non-final data packets of the at least one data flow from the sending network element to the wireless device during the time period less an idle time of a wireless communication link between an access node and the wireless device during the time period and less a total time to deliver the final data packets of the at least one data flow.

6. The method of claim 1, further comprising performing the traffic management procedure when the difference of the first throughput value and the second throughput value indicates the presence of a number of short-lived data flows which meets a short-lived data flow threshold.

7. The method of claim 6, wherein performing the traffic management procedure further comprises performing a handover of the wireless device from the access node to a second access node when the difference of the first throughput value and the second throughput value indicates the presence of a number of short-lived data flows which meets a short-lived data flow threshold.

8. The method of claim 6, wherein performing the traffic management procedure further comprises limiting an amount of data transmitted within a predetermined time period from the access node to the wireless device when the difference of the first throughput value and the second throughput value indicates the presence of a number of short-lived data flows which meets a short-lived data flow threshold.

9. The method of claim 6, wherein performing the traffic management procedure further comprises limiting an amount of wireless communication link resources used to convey data from the access node to the wireless device when the difference of the first throughput value and the second throughput value indicates the presence of a number of short-lived data flows which meets a short-lived data flow threshold.

10. A method of managing uneven data flow in a wireless communication network, comprising:
 receiving at a network element from a plurality of access nodes a first total amount of data transmitted in non-final data packets of a plurality of data flows from a sending network element to at least one wireless device and a second total amount of data in final data packets of the plurality of data flows transmitted from the sending network element to the at least one wireless device during a time period;
 calculating at the network element a first throughput value based on the first total amount of data and the second amount of data;
 calculating at the network element a second throughput value based on the first total amount of data transmitted in non-final data packets of the plurality of data flows from the sending network element to the wireless device during the time period;
 monitoring a difference of the first throughput value and the second throughput value; and
 instructing a performance of a handover of one of the wireless devices from a first access node to a second access node when the difference of the first throughput value and the second throughput value meets a throughput threshold.

11. The method of claim 10, further comprising:
 calculating the second throughput value comprising the first total amount of data transmitted in non-final data packets from the sending network element to the at least one wireless device during the time period less an idle time of a wireless communication link between one of the plurality of access nodes and the at least one wireless device during the time period.

12. The method of claim 11, further comprising:
 calculating the second throughput value comprising the first total amount of data transmitted in non-final data packets from the sending network element to the at least one wireless device during the time period less an idle time of a wireless communication link between one of the plurality of access nodes and the at least one wireless device during the time period and less a total time to deliver the final data packets.

13. The method of claim 12, further comprising:
 calculating the second throughput value comprising the first total amount of data transmitted in non-final data packets from the sending network element to the wireless device during the time period less an idle time of a wireless communication link between an access node and the wireless device during the time period and less a total time to deliver the final data packets of a plurality of data flows.

14. The method of claim 10, further comprising:
 instructing the performance of the handover of the wireless device from the first access node to the second access node when the difference of the first throughput value and the second throughput value indicates the presence of a number of short-lived data flows which meets a short-lived data flow threshold.

15. The method of claim 10, further comprising:
 calculating at the network element for each of the plurality of access nodes a first throughput value based on the first total amount of data and the second amount of data; and
 calculating at the network element for each of the plurality of access nodes a second throughput value based on the first total amount of data transmitted in non-final data packets of the plurality of data flows from the sending network element to the wireless device during the time period.

16. The method of claim 15, further comprising:
 monitoring a difference of the first throughput value and the second throughput value for each of the plurality of access nodes; and
 instructing the performance of a handover of one of the wireless devices from the first access node to the second access node when the difference of the first throughput value and the second throughput value at the first access node meets a throughput threshold.

17. The method of claim 16, further comprising:
 instructing the performance of a handover of one of the wireless devices from the first access node to the second access node when the difference of the first throughput value and the second throughput value at the first access node meets a throughput threshold and when the difference of the first throughput value and the second throughput value at the second access node is less than the difference of the first throughput value and the second throughput value at the first access node.

18. A system for managing uneven data flow in a wireless communication network, comprising:
 a processing node configured to
  determine a first throughput value comprising a first total amount of data transmitted in non-final data packets from a sending network element to a wireless device and a second total amount of data in final data packets transmitted from the sending network element to the wireless device during a time period;
  determine a second throughput value comprising the first total amount of data transmitted in non-final data packets from the sending network element to the wireless device during the time period less an idle time of a wireless communication link between an access node and the wireless device during the time period and less a total time to deliver the final data packets;
  calculate a difference of the first throughput value and the second throughput value; and
  perform a traffic management procedure at an access node of the wireless communication network when the difference of the first throughput value and the second throughput value meets a throughput threshold.

19. The system of claim 18, wherein the processing node is further configured to:
 determine a first throughput value comprising a first total amount of data transmitted in non-final data packets of at least one data flow from a sending network element to the wireless device a wireless device and a second total amount of data in final data packets of the at least one data flow transmitted from the sending network element to the wireless device during a time period; and
 determine a second throughput value comprising the first total amount of data transmitted in non-final data packets of the at least one data flow from the sending network element to the wireless device during the time period less an idle time of a wireless communication link between an access node and the wireless device during the time period and less a total time to deliver the final data packets of the at least one data flow.

20. The system of claim 18, wherein the processing node is further configured to:

perform the traffic management procedure when the difference of the first throughput value and the second throughput value indicates the presence of a number of short-lived data flows which meets a short-lived data flow threshold.

* * * * *